United States Patent
Piper et al.

(10) Patent No.: US 10,464,611 B2
(45) Date of Patent: Nov. 5, 2019

(54) PILLAR ASSEMBLIES FOR VEHICLES HAVING SECTIONS FORMED OF MATERIALS HAVING DIFFERENT MATERIAL PROPERTIES

(71) Applicant: Toyota Motor Engineering & Manufacturing North America, Inc., Erlanger, KY (US)

(72) Inventors: Peter C. J. Piper, Saline, MI (US); Alex B. Taylor, Ottawa Lake, MI (US); Jonathan R. Young, Saline, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 35 days.

(21) Appl. No.: 15/848,863

(22) Filed: Dec. 20, 2017

(65) Prior Publication Data
US 2019/0185064 A1    Jun. 20, 2019

(51) Int. Cl.
*B62D 25/04* (2006.01)
*B62D 25/20* (2006.01)
*B62D 25/06* (2006.01)

(52) U.S. Cl.
CPC .......... *B62D 25/04* (2013.01); *B62D 25/2036* (2013.01); *B60Y 2306/01* (2013.01); *B62D 25/06* (2013.01)

(58) Field of Classification Search
CPC .... B62D 25/04; B62D 25/06; B62D 25/2036; B60Y 2306/01
USPC .................................................. 296/187.12
See application file for complete search history.

(56) References Cited

U.S. PATENT DOCUMENTS

| 7,396,072 | B2  | 7/2008 | Fischer et al. |
| 7,914,068 | B2* | 3/2011 | Mizohata ............... B62D 25/02 |
|           |     |        | 296/187.12 |
| 9,637,173 | B2* | 5/2017 | Nishimura ............ B62D 25/02 |

FOREIGN PATENT DOCUMENTS

| DE | 102014106356 | 11/2015 |
| DE | 102015002546 | 9/2016  |
| EP |      2392504 | 6/2013  |
| WO |   2016046637 | 3/2016  |
| WO |   2017103138 | 6/2017  |

* cited by examiner

*Primary Examiner* — Joseph D. Pape
*Assistant Examiner* — Dana D Ivey
(74) *Attorney, Agent, or Firm* — Dinsmore & Shohl LLP (57) ABSTRACT

A vehicle includes a rocker support that extends in a vehicle longitudinal direction. A side roof rail structure extends in a vehicle longitudinal direction along a vehicle roof assembly. A front pillar assembly is coupled to and extends upward from the rocker support to the side roof rail structure. The front pillar assembly includes a first panel that extends along a height of the front pillar assembly at a front side of the front pillar assembly. A second panel extends along the height of the front pillar assembly that is connected to the first panel at least partially defining an enclosed cavity that extends along the height of the front pillar assembly. The first panel is formed of a material having a lower minimum tensile strength than a material forming the second panel thereby forming a zone of reduced minimum tensile strength along the front side of the front pillar assembly.

18 Claims, 5 Drawing Sheets

PILLAR ASSEMBLIES FOR VEHICLES HAVING SECTIONS FORMED OF MATERIALS HAVING DIFFERENT MATERIAL PROPERTIES

TECHNICAL FIELD

The present specification generally relates to pillar assemblies for vehicles and, more specifically, to pillar assemblies having sections formed of materials having different material properties.

BACKGROUND

Automotive vehicle bodies may include a variety of structures that provide strength and rigidity to the vehicle in the event of an impact to the vehicle. The underlying structure is generally comprised of a series of sheet metal structures which are joined to create the vehicle body.

The pillar assemblies may typically be closed structures that may be welded at a bottom to a vehicle rocker assembly and extend upwardly in a vehicle vertical direction toward a roof assembly. Vehicles frequently include multiple pillars spaced around the vehicles to provide supports for the roof assembly as well as vehicle windows and door structures. Due to presence of the pillar assemblies about a cabin of the vehicle, it may be desirable for the pillar assemblies to behave in a predictable fashion under certain impact testing conditions, while absorbing energy from the impact.

Accordingly, a need exists for pillar assemblies that absorb energy during impact conditions.

SUMMARY

In one embodiment, a vehicle includes a rocker support that extends in a vehicle longitudinal direction. A side roof rail structure extends in a vehicle longitudinal direction along a vehicle roof assembly. A front pillar assembly is coupled to and extends upward from the rocker support to the side roof rail structure. The front pillar assembly includes a first panel that extends along a height of the front pillar assembly at a front side of the front pillar assembly. A second panel extends along the height of the front pillar assembly that is connected to the first panel at least partially defining an enclosed cavity that extends along the height of the front pillar assembly. The first panel is formed of a material having a lower minimum tensile strength than a material forming the second panel thereby forming a zone of reduced minimum tensile strength along the front side of the front pillar assembly.

In another embodiment, a front pillar assembly couples to a rocker support and side roof rail structure. The front pillar assembly includes a first panel that extends along a height of the front pillar assembly at a front side of the front pillar assembly. A second panel extends along the height of the front pillar assembly that is connected to the first panel at least partially defining an enclosed cavity that extends along the height of the front pillar assembly. The first panel is formed of a material having a lower minimum tensile strength than a material forming the second panel thereby forming a zone of reduced minimum tensile strength along the front side of the front pillar assembly.

In another embodiment, a method of forming a front pillar assembly of a vehicle is provided. The method includes engaging a first panel to a second panel. The first panel extends from an outer side, over a corner and over a front side of the pillar assembly. The second panel extends over the outer side, over another corner and over a rear side of the front panel assembly. The first panel and the second panel are connected together at least partially defining a cavity that extends along a height of the front pillar assembly. The first panel is formed of a material having a lower minimum tensile strength than a material forming the second panel thereby forming a zone of reduced minimum tensile strength along the front side of the front pillar assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to pillar assemblies for vehicles having improved energy absorption capabilities. The pillar assemblies may be connected to a rocker assembly that generally forms a lower frame of a vehicle door opening and extend upwardly in a vehicle vertical direction to a roof assembly of the vehicles. A front pillar assembly, sometimes referred to as an A-pillar, may generally form a front side frame of a front vehicle door opening. The front pillar assembly may be connected to the rocker assembly and extend upwardly in the vehicle vertical direction and be connected to a side roof rail structure. The front pillar assembly may be formed of a number of panels that can form an enclosed structure at a front corner of the vehicle. As will be described in greater detail below, the front pillar assembly may include one or more panels having material properties, such as tensile strength, that are different than one or more other panels of the front pillar assembly. For example, one or more panels located forward of the one or more other panels may be of reduced tensile strength compared to the one or more other panels, thereby dividing the front pillar assembly into a front portion of reduced tensile strength compared to a rear portion and the rear portion of increased tensile strength compared to the front portion.

Figure 1:
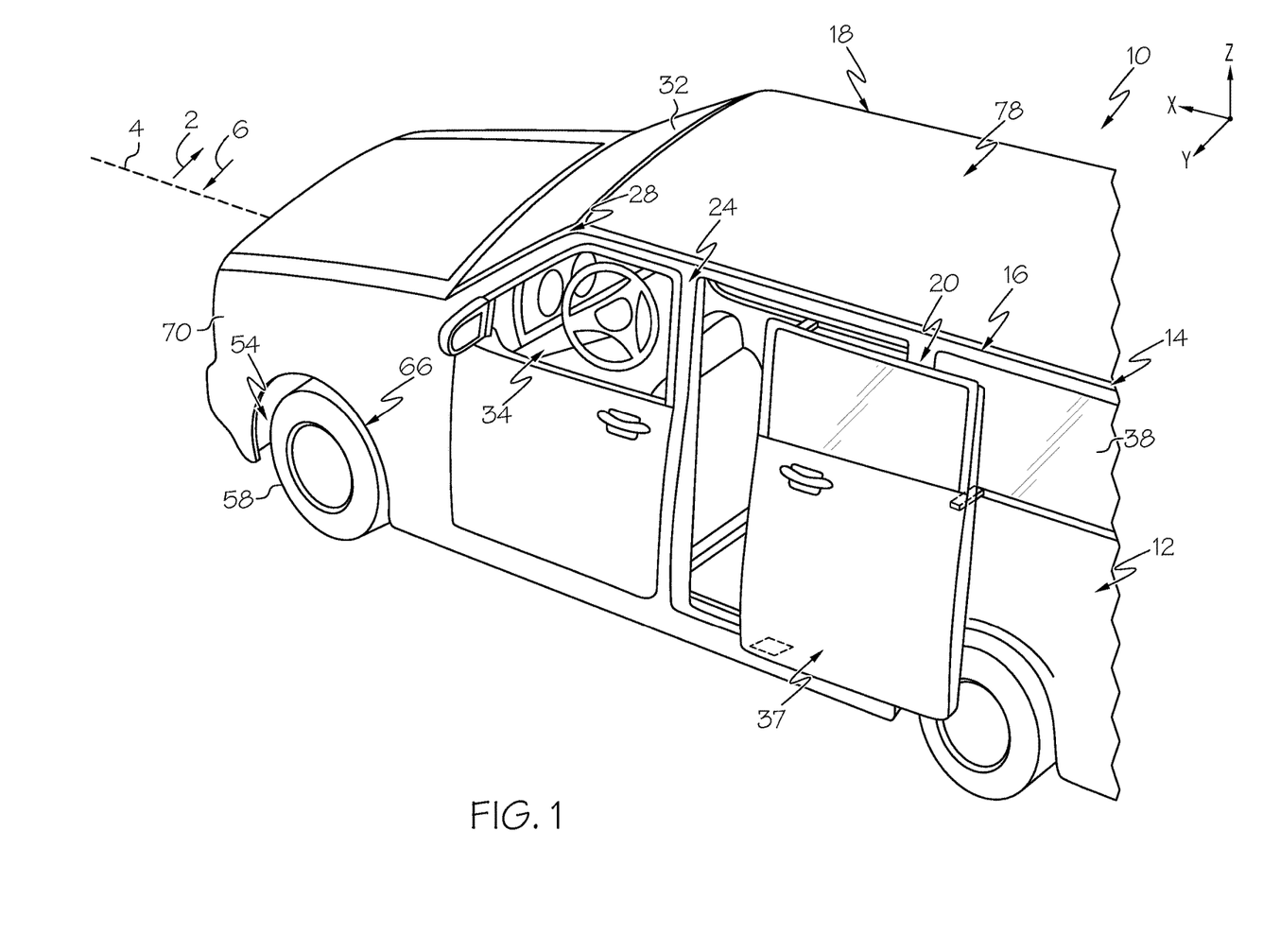
FIG. 1 is a perspective view of a motor vehicle, according to one or more embodiments shown and described herein.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Motor vehicles that incorporate elements according to the present disclosure may include a variety of construction methodologies that are conventionally known, including a unibody construction methodology as well as a body-on-frame construction methodology. It should be understood that vehicles that are constructed with body-on-frame or unibody construction may incorporate the elements that are shown and described herein.

Referring to FIG. 1, the vehicle 10, in this example a minivan, includes a vehicle body 12 including a body framework 14 that includes a pair of side roof rail structures 16 and 18 and various pillar assemblies. The various pillar assemblies are connected to the side roof rail structures 16 and 18 and extend downwardly therefrom in a vehicle vertical direction. These pillar assemblies are generally referred to as a C-pillar assembly 20, B-pillar assembly 24 and a front or A-pillar assembly 28. The front pillar assemblies 28 are located toward the forward end of the vehicle 10, generally between a front windshield 32 and front side windows 34. The B-pillar assemblies 24 are located generally between the front side windows 34 and door 37 of the vehicle 10. Finally, the C-pillar assemblies 20 are located between the door 37 and rear side window 38 of the vehicle. Depending on vehicle type, other pillar assemblies, such as D-pillar assemblies may be located rearward of the C-pillar assemblies 20 (e.g., between rear side windows and rear window).

Figure 2:
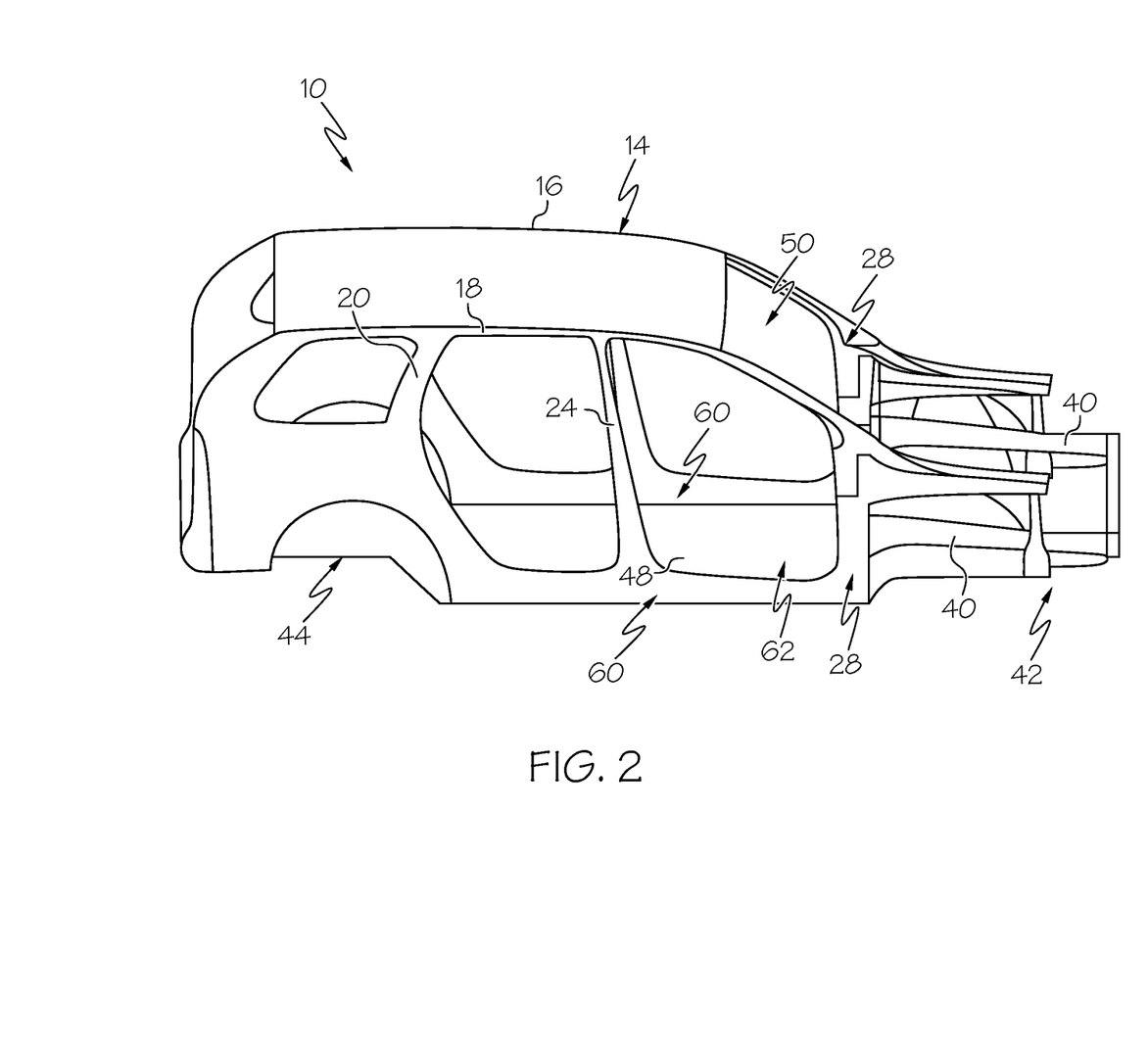
FIG. 2 is a perspective view of a vehicle frame including a front pillar assembly, according to one or more embodiments shown and described herein.

Referring to FIG. 2, the body framework 14 includes a pair of side members 40 that are spaced apart from one another in the vehicle in the vehicle lateral direction. The side members 40 extend in the vehicle longitudinal direction. The side members 40 may extend between at least front suspension mounts 42 and rear suspension mounts 44 that are positioned rearward of the front suspension mounts 42 in the vehicle longitudinal direction. In some embodiments, the side members 40 may be formed integrally along their length. In other embodiments, the side members 40 may be fabricated from a plurality of vehicle structural components that are coupled to one another so as to transfer load. In ordinary vehicle operation, the side members 40 may contribute to overall vehicle stiffness, such that forces introduced to the front suspension mounts 42 and the rear suspension mounts 44 of the vehicle 10 can be reacted by the body framework 14. In vehicle embodiments exhibiting unibody construction, the side members 40 may be integral with the vehicle body 12, such that the side members 40 are incorporated into cabin 50, for example, by the side members 40 forming a portion of the floor 48 of the cabin 50. In other vehicle embodiments, including, for example, vehicle embodiments exhibiting body-on-frame construction, the side members 40 may be separately attached to the cabin 50.

The vehicle body 12 can include a pair of rocker assemblies 60 that extend in the vehicle longitudinal direction, and are generally parallel to the side members 40 of the vehicle body 12. The pair of rocker assemblies 60 may be positioned outboard from the side members 40 of the vehicle body 12. The rocker assemblies 60 may be positioned proximate to a lower portion of a door opening 62 of the cabin 50, and rearward of the wheels 58 (FIG. 1) of front suspension units 54. The rocker supports 60 may also be positioned proximate to the floor 48 of the cabin 50.

The vehicle body 12 includes the front pillar assemblies 28. The front pillar assemblies 28 may extend generally upward in the vertical direction from the pair of rocker assemblies 60 to support the side roof rail structures 16 and 18. The vehicle body 12 may further include rear pillar assemblies 20 and middle pillar assemblies 24, as discussed above. The front pillar assemblies 28, middle pillar assemblies 24, and rear pillar assemblies 20 may each be coupled to the rocker assemblies 60 of the vehicle body 12.

Referring also to FIG. 1, a pair of wheel well portions 66 are positioned forward of the rocker assemblies 60. The wheel well portions 66 may be positioned outboard of the side members 40 in the vehicle lateral direction. The wheel well portions 66 may extend in an outboard direction to a position generally proximate to the rocker assemblies 60 in the vehicle lateral direction. The wheel well portions 66 may be formed integrally with the front pillar assemblies 28 or, alternatively, may be coupled to the front pillar assemblies 28. The wheels 58 (FIG. 1) of the front suspension unit 54 may be generally positioned at least partially within the wheel well portions 66 and forward of the rocker supports 60 in the vehicle longitudinal direction. Additionally, the front suspension units 54 may extend between the front suspension mounts 42 and the wheel well portions 66 and may be positioned at least partially within the wheel well portions 66. The wheel well portions 66 may accommodate portions of the front suspension unit 54 that are coupled to and extend in an outboard direction from the front suspension mount 42 of the vehicle body 12. The wheel well portions 66 may separate the cabin 50 and the front suspension units 54 that are coupled to the front suspension mounts 42.

The wheel well portions 66 may include fender panels 70 that may have concave portions that face away from the cabin 50 of the vehicle body 12. The fender panels 70 of the wheel well portions 66 may be shaped to generally accommodate the wheel 58 of the front suspension unit 54 that is coupled to the front suspension mount 44.

Figure 3:
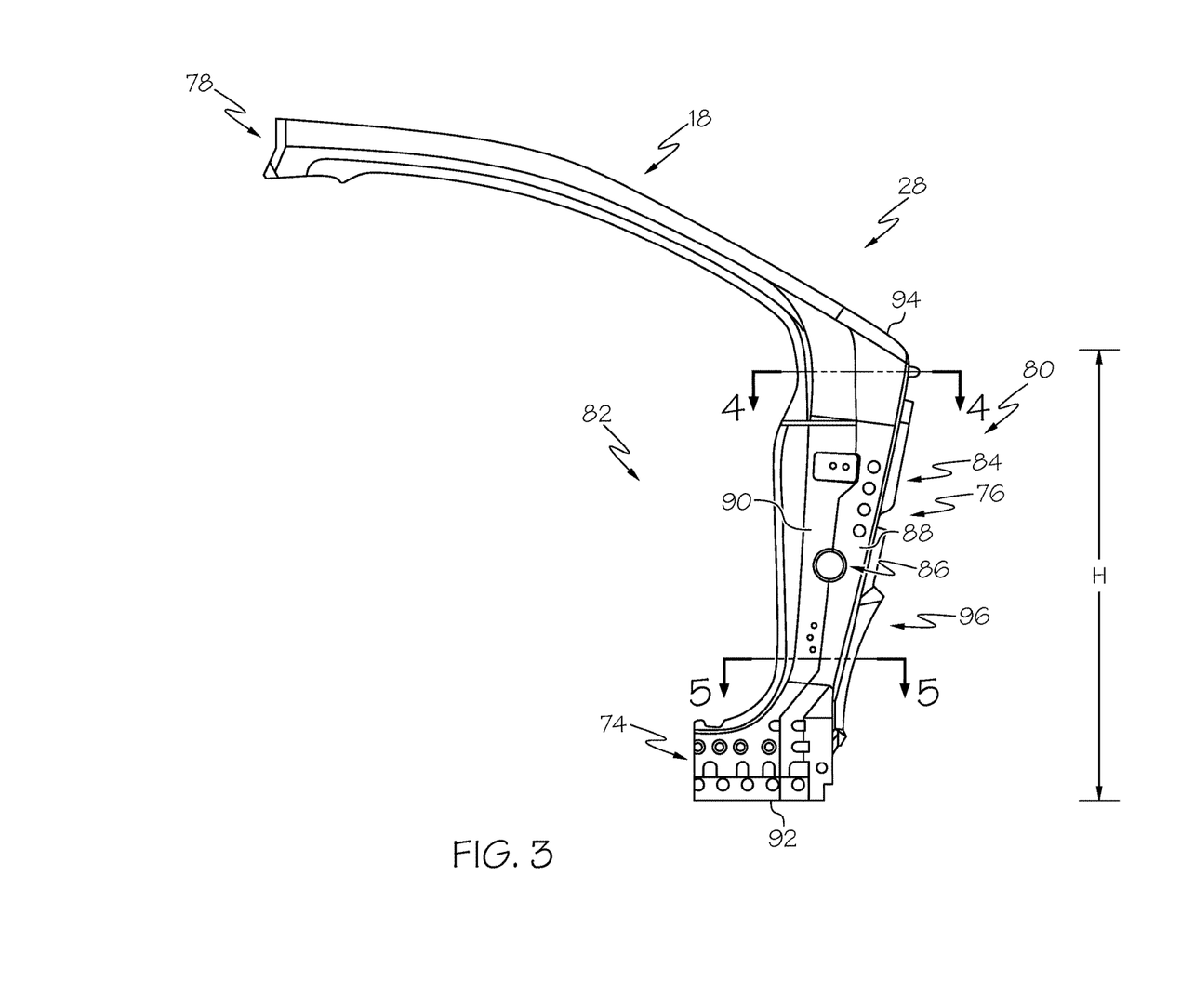
FIG. 3 is a side view of the front pillar assembly of FIGS. 1 and 2 in isolation connected to a side roof rail structure, according to one or more embodiments shown and described herein.

Referring to FIG. 3, a representative front pillar assembly 28 is illustrated in isolation. The front pillar assembly 28 includes a rocker connecting portion 74 that extends generally in the vehicle longitudinal direction for connection with the rocker assembly 60 and a roof rail connecting portion 76 that extends generally in the vehicle vertical direction for connection with the side roof rail structure 18 forming a somewhat L-shape that spans between the rocker assembly 60 and the side roof rail structure 18 thereby providing reinforcement for a roof assembly 78 (FIG. 1) in the vehicle vertical direction.

The front pillar assembly 28 includes a front side 80, a rear side 82, an inner side 84 and an outer side 86. The inner side 82 and the outer side 86 extend between the front side 80 and the rear side 82. The rocker connecting portion 74 extends rearward in the vehicle longitudinal direction from the rear side 82. The side roof rail structure 18 extends upward in the vehicle vertical direction and rearward in the vehicle longitudinal direction from the roof rail connecting portion 76.

The front pillar assembly 28 may be formed of multiple, interconnected panels. As an example, the front side 80 of the front pillar assembly 28 is formed of one or more interconnected panels 88 formed of a lower tensile strength material than one or more panels 90 forming the rear side 82 of the front pillar assembly 28. The panel 88 may extend over a preselected height H of the front pillar assembly 28 measured between a bottom edge 92 of the rocker connecting portion 74 to a top edge 94 of the roof rail connecting portion 76 where the roof rail connecting portion 76 meets the side roof rail structure 18 forming a vertically extending zone 96 of reduced minimum tensile strength located at the front side 80 and extending along the height H of the front pillar assembly 28. In some embodiments, the zone 96 of reduced minimum tensile strength formed by the panel 88 may extend at least about half of the height H, such as at least about 75 percent of the height H, such as the entire height H of the front pillar assembly 28 from the bottom edge 92 to the top edge 94 and located at the front side 80.

Figure 4:
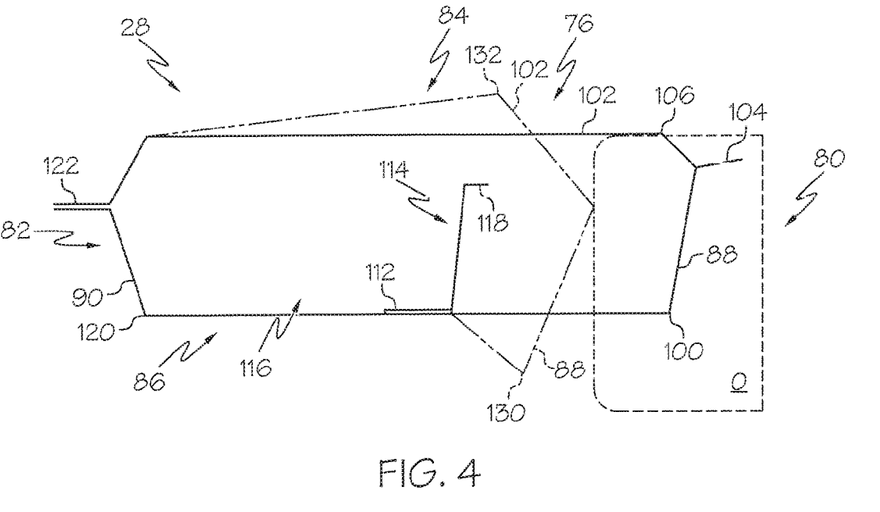
FIG. 4 is a section view of the front pillar assembly along line 4-4 of FIG. 3, according to one or more embodiments shown and described herein.
Figure 5:
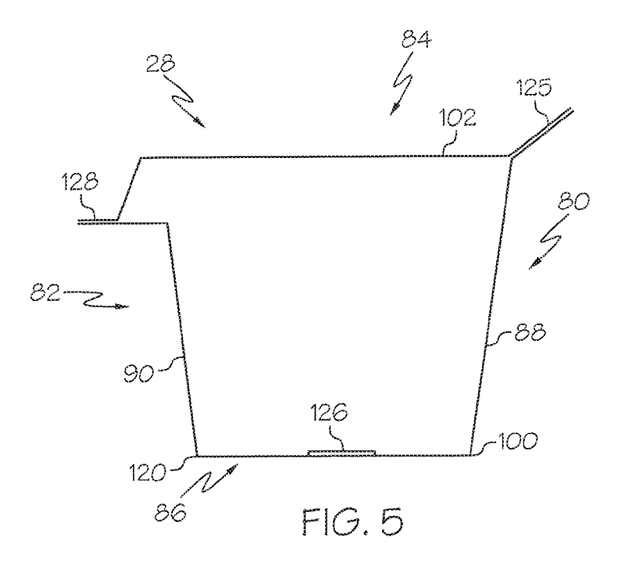
FIG. 5 is a section view of the front pillar assembly along line 5-5 of FIG. 3, according to one or more embodiments shown and described herein.

FIGS. 4 and 5 illustrate exemplary sections at lines 4-4 and 5-5 of FIG. 3. Referring first to FIG. 4, a section near the top edge 94 of the roof rail connecting portion 76 is illustrated. The front pillar assembly 28 includes the front side 80, the rear side 82, the inner side 84 and the outer side 86. The panel 88 with relatively low tensile strength is located at the front side 80 of the roof rail connecting portion 76. In particular, the panel 88 extends from the outer side 86, around corner 100 and over at least a portion of the front side 80. The panel 88 is formed of a lower strength material, such as a 440 MPa or 540 MPa minimum tensile strength steel. As used herein, the term "lower strength material" or "higher strength material" refers to the relative strength of the panels to one another. For example, a 440 MPa minimum tensile strength steel may still be considered a high-strength steel, but may be formed from a lower minimum tensile strength material that another panel. Further, reference to a particular tensile strength may be considered a minimum tensile strength for a particular panel.

The panel 88 may be connected to another panel 102 at a weld flange 104. The weld flange 104 may also extend vertically along the height H of the front pillar assembly 28. The weld flange 104 connecting the panels 88 and 102 may be located at the front side 80 of the front pillar assembly 28. In this regard, the panel 102 may extend from the inner side 84, around corner 106 and over at least a portion of the front side 80. The panel 102 may also be formed of a lower strength material, such as a 440 MPa or 540 MPa minimum tensile strength steel. In some embodiments, the panels 88 and 102 may be formed of the same strength of material. In other embodiment, the materials of the panels 88 and 102 may be different. For example, the panel 88 may be formed of a lowest minimum tensile strength steel, such as 440 MPa minimum tensile strength steel and the panel 102 may be formed of a higher minimum tensile strength steel, such as 540 MPa minimum tensile strength steel or vice versa.

The panels 88 and 102 formed of relatively lower minimum tensile strength material are connected to another panel 90 formed of a relatively higher minimum tensile strength material, such as 1180 MPa minimum tensile strength steel. In the example of FIG. 4, the panel 88 and panel 90 overlap one another at a weld location 112 that is located at the outer side 86. In some embodiments, the panel 90 may include an inwardly extending portion 114 that extends into a cavity 116 that is enclosed by the panels 88, 102 and 90. The inwardly extending portion 114 may include a flange 118 that, for example, can be used to engage the panel 102 during certain side impact conditions and provide a reinforcement against intrusion of the panel 88 and 102 into the cabin. The inwardly extending portion 114 may also be provided to engage the panels 88 and 102 under certain front impact conditions.

The panel 90 extends rearward from the weld location 112 to the rear side 82 of the front pillar assembly 28. The panel 90 may extend from the outer side 86, around corner 120 and over at least a portion of the rear side 82. The panel 90 may also be formed of a higher strength material compared to the panels 88 and 102, such as an 1180 MPa minimum tensile strength steel, as noted above. The panel 90 may be connected to the panel 102 at a weld flange 122 located at the rear side 82. The weld flange 122 may also extend vertically along the height H of the front pillar assembly 28.

Referring now to FIG. 5, a lower section of the front pillar assembly 28 is illustrated nearer the rocker connecting portion 74. Again, the front pillar assembly 28 at the illustrated lower section includes the front side 80, the rear side 82, the inner side 84 and the outer side 86. The panel 88 with relatively low tensile strength is located at the front side 80 of the roof rail connecting portion 76. The panel 88 extends from the outer side 86, around corner 100 and over at least a portion of the front side 80.

The panel 88 may be connected to panel 102 at weld flange 125. The weld flange 125 may be the same or a different weld flange from that of the section of FIG. 4. The weld flange 125 connecting the panels 88 and 102 may be located at the front side 80 of the front pillar assembly 28. The panel 102 may extend from the inner side 84 to the weld flange 125.

The panels 88 and 102 formed of relatively lower minimum tensile strength material are connected to the panel 90 formed of a relatively higher minimum tensile strength material. The panel 88 and panel 90 overlap one another at a weld location 126 that is located at the outer side 86. The panel 90 extends rearward from the weld location 126 to the rear side 82 of the front pillar assembly 28. The panel 90 may extend from the outer side 86, around corner 120 and over at least a portion of the rear side 82. The panel 90 may also be formed of a higher strength material compared to the panels 88 and 102, such as an 1180 MPa minimum tensile strength steel, as noted above. The panel 90 may be connected to the panel 102 at a weld flange 128 located at the rear side 82. The weld flange 128 may also extend vertically along the height H of the front pillar assembly 28.

Referring again to FIG. 4, operation of the front pillar assembly 28 and the relatively lower minimum tensile strength panels 88 and 102 and relatively higher minimum tensile strength panel 90 is illustrated by dashed lines. Under certain front impact conditions, vehicle structures tend to elastically and plastically deform thereby absorbing and transferring impact energy. These vehicle structures can include the front pillar assemblies, not only for a minivan, but for other types of vehicles, such as trucks, SUVs, sedans, etc.

As an object O engages the front side 80 of the front pillar assembly 28, the lower minimum tensile strength panels 88 and 102 tend to deform before the higher minimum tensile strength panel 90. This impact by the object O may be considered a small overlap-type impact, as an example. As can be seen by the example of FIG. 4, the panel 88 may buckle outward to a bend 130 and the panel 102 may buckle inward to a bend 132. Buckling of the panels 88 and 102 allow for increased movement (or stroke) of the object O relative to the front pillar assembly 28, which can be used to spread impact forces over a greater distance.

The higher minimum tensile strength panel 90 inhibits further deformation of the front pillar assembly 28 once the lower minimum tensile strength panels 88 and 102 are deformed. The higher minimum tensile strength panel 90 is provided to compliment the lower minimum tensile strength panels 88 and 102 and provide during the front impact.

Figure 6:
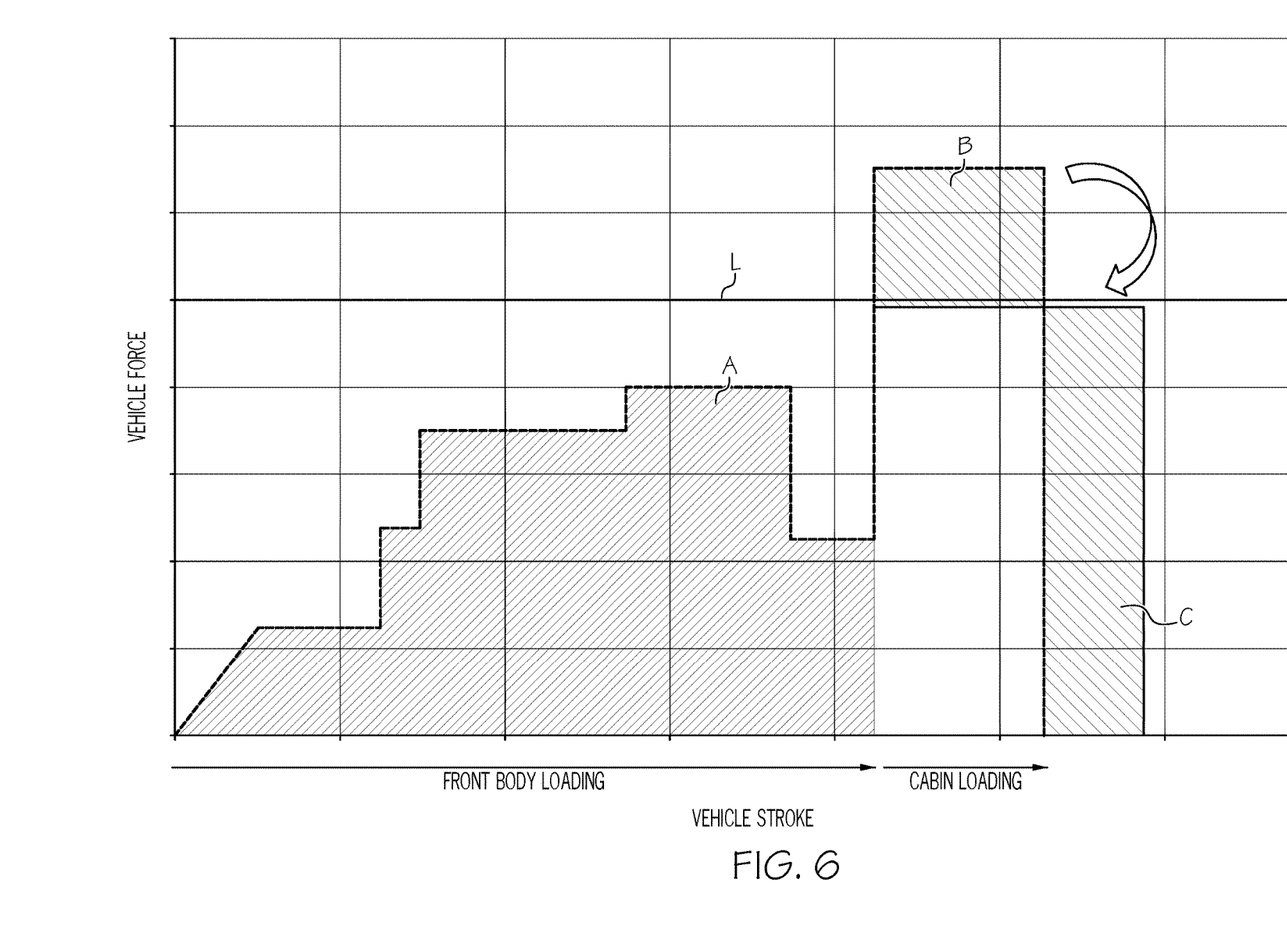
FIG. 6 represents a plot of vehicle force versus stroke, according to one or more embodiments shown and described herein.

Referring to FIG. 6, a force versus distance diagram is shown to illustrate a reduction in force during cabin loading due to the increase stroke allowed by the use of the lower minimum tensile strength panels 88 and 102. As a front body of the vehicle is impacted at area A, for example, during frontal impact testing conditions, the maximum force remains below a preselected maximum force shown by line L. This reduced maximum impact force as the front body of the vehicle is impacted may be due at least in part to a number of various impact structures provided at the front body that are used to absorb and transfer impact energy. As the impact energy moves toward the cabin of the vehicle, forces may be increased at the front pillar assembly. Area B is representative of an increase in force that may be seen at a current front pillar assembly without the above-described soft zone. Area C represents the force that can be seen at the front pillar assembly with the soft zone described above. The force is spread over a greater stroke distance, which can reduce the maximum force experienced by the front pillar assembly.

The above-described front pillar assemblies are formed of panels having different material properties that are connected together to provide the front pillar structure. One or more panels located at a front side of the front pillar assemblies may have a minimum tensile strength that is less than one or more panels located at a rear side of the front pillar assemblies. The lower minimum tensile strength of the panels at the front side of the front pillar assemblies can allow for some deformation of the front side of the front pillar assemblies while the higher tensile strength of the panels at the rear side of the front pillar assemblies can resist further deformation of the front pillar assemblies, even after the front side of the front pillar assemblies deforms.

It should be noted that steels may be identified by their minimum tensile strength in megapascals (MPa). As used herein, the term "minimum tensile strength" refers to the ultimate tensile strength of a steel material that can be used in determining tensile stress before failure of a particular steel in a reliable fashion. Ultimate tensile strength is measured by the maximum tensile stress that a material can withstand while being stretched or pulled before breaking. Tensile strength may be found by performing a tensile test and recording the engineering stress versus strain. The minimum tensile strength of a steel may be determined using a statistical analysis over a number of tensile tests for a material and may generally be found on a data sheet or table for a known steel type and forming process. High-strength steel (HSS) may be defined as any steel with a minimum tensile strength of 340 MPa or higher. Ultra-high-strength steel (UHSS) may by defined as any steel with a minimum tensile strength of 980 MPa or higher. Any suitable tensile strength testing method can be used to determine the relative degree of tensile strength between two parts.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Directional terms used herein—for example widthwise, lengthwise, vertical, up, down, right, left, front, back, top, bottom, upper, lower—are made only to supply directional context.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a rocker support that extends in a vehicle longitudinal direction;
a side roof rail structure that extends in a vehicle longitudinal direction along a vehicle roof assembly;
a front pillar assembly coupled to and extending upward from the rocker support to the side roof rail structure, the front pillar assembly comprising:
a first panel that extends along a height of the front pillar assembly at a front side of the front pillar assembly; and
a second panel that extends along the height of the front pillar assembly that is connected to the first panel at least partially defining an enclosed cavity that extends along the height of the front pillar assembly;
wherein the first panel is formed of a material having a lower minimum tensile strength than a material forming the second panel thereby forming a zone of reduced minimum tensile strength along the front side of the front pillar assembly;
wherein the first panel extends from an outer side over a corner and over at least a portion of the front side of the front pillar assembly.

2. The vehicle of claim 1, wherein the first panel has a minimum tensile strength of no greater than 540 MPa.

3. The vehicle of claim 2, wherein the second panel has a minimum tensile strength value of no less than 980 MPa.

4. The vehicle of claim 1, wherein the front pillar assembly includes a rocker connecting portion connected to the rocker support and a roof rail connecting portion connected to the side roof rail structure.

5. The vehicle of claim 4, wherein the first panel extends along at least 50 percent of a height of the front pillar assembly measured between a lower edge of the rocker connecting portion to an upper edge of the roof rail connecting portion connected to the side roof rail structure.

6. The vehicle of claim 4, wherein the first panel forms part of the rocker connecting portion and the roof rail connecting portion of the front pillar assembly.

7. The vehicle of claim 6, wherein the second panel forms part of the rocker connecting portion and the roof rail connecting portion of the front pillar assembly.

8. A front pillar assembly that couples to a rocker support and side roof rail structure, the front pillar assembly comprising:
a first panel that extends along a height of the front pillar assembly at a front side of the front pillar assembly; and a second panel that extends along the height of the front pillar assembly that is connected to the first panel at least partially defining an enclosed cavity that extends along the height of the front pillar assembly;

wherein the first panel is formed of a material having a lower minimum tensile strength than a material forming the second panel thereby forming a zone of reduced minimum tensile strength along the front side of the front pillar assembly;

wherein the first panel extends from an outer side over a corner and over at least a portion of the front side of the front pillar assembly.

9. The front pillar assembly of claim 8, wherein the first panel has a minimum tensile strength of no greater than 540 MPa.

10. The front pillar assembly of claim 9, wherein the second panel has a minimum tensile strength value of no less than 980 MPa.

11. The front pillar assembly of claim 8, wherein the front pillar assembly includes a rocker connecting portion that connects to the rocker support and a roof rail connecting portion that connects to the side roof rail structure.

12. The front pillar assembly of claim 11, wherein the first panel extends along at least 50 percent of a height of the front pillar assembly measured between a lower edge of the rocker connecting portion to an upper edge of the roof rail connecting portion.

13. The front pillar assembly of claim 11, wherein the first panel forms part of the rocker connecting portion and the roof rail connecting portion of the front pillar assembly.

14. The front pillar assembly of claim 13, wherein the second panel forms part of the rocker connecting portion and the roof rail connecting portion of the front pillar assembly.

15. A method of forming a front pillar assembly of a vehicle, the method comprising:

engaging a first panel to a second panel, the first panel extending from an outer side, over a corner and over a front side of the pillar assembly, the second panel extending over the outer side, over another corner and over a rear side of the front panel assembly;

connecting the first panel and the second panel together at least partially defining a cavity that extends along a height of the front pillar assembly;

wherein the first panel is formed of a material having a lower minimum tensile strength than a material forming the second panel thereby forming a zone of reduced minimum tensile strength along the front side of the front pillar assembly.

16. The method of claim 15, wherein the first panel has a minimum tensile strength of no greater than 540 MPa.

17. The method of claim 15, wherein the first panel forms part of a rocker connecting portion and a roof rail connecting portion of the front pillar assembly.

18. The method of claim 17, wherein the second panel forms part of the rocker connecting portion and the roof rail connecting portion of the front pillar assembly.

\* \* \* \* \*